United States Patent [19]
Tatamiya

[11] Patent Number: 5,606,380
[45] Date of Patent: Feb. 25, 1997

[54] SHOCK ABSORBING APPARATUS FOR A MIRROR IN AN SLR CAMERA

[75] Inventor: Hisashi Tatamiya, Tokyo, Japan

[73] Assignee: Asahi Kogaku Kogyo Kabushiki Kaisha, Tokyo, Japan

[21] Appl. No.: 605,500

[22] Filed: Feb. 26, 1996

[30] Foreign Application Priority Data

Feb. 27, 1995 [JP] Japan .................................. 7-038566

[51] Int. Cl.⁶ .................................................. G03B 19/12
[52] U.S. Cl. .................................................. 396/358
[58] Field of Search .................................. 354/152, 156, 354/202

[56] References Cited

U.S. PATENT DOCUMENTS

| | | | |
|---|---|---|---|
| 3,837,441 | 9/1974 | Uno et al. | 188/82.6 |
| 3,882,523 | 5/1975 | Uno et al. | 354/156 |
| 3,913,117 | 10/1975 | Endo et al. | 354/242 |
| 4,264,170 | 4/1981 | Kurei | 354/152 |
| 4,385,820 | 5/1983 | Shono | 354/152 |
| 5,257,052 | 10/1993 | Kurosaki et al. | 354/153 |
| 5,294,952 | 3/1994 | Misawa | 354/152 |

*Primary Examiner*—Safet Metjahic
*Assistant Examiner*—J. K. Han
*Attorney, Agent, or Firm*—Greenblum & Bernstein P.L.C.

[57] ABSTRACT

A shock absorbing apparatus for a mirror in a single lens reflex camera includes a mirror drive mechanism which moves the mirror, normally located within a photographing optical path, out of the photographing optical path immediately before the photographing operation. A damper damps shock caused when the mirror is moved by the mirror drive mechanism. The damper includes a cylinder, a piston which is moved in the cylinder and which is connected to the mirror, a valve mechanism which opens and closes a flow passage in accordance with the movement of the piston, and an adjusting device which adjusts a surface area of the flow passage.

9 Claims, 9 Drawing Sheets

SHOCK ABSORBING APPARATUS FOR A MIRROR IN AN SLR CAMERA

BACKGROUND OF THE INVENTION

1. Field of the Invention

The present invention relates to a shock absorber for damping a shock applied to a quick return mirror or a camera body of a single lens reflex camera, when the quick return mirror is retracted from or moved into a photographing optical path.

2. Description of Related Art

In a single lens reflex camera, during the framing of a shot (viewing), a quick return mirror is normally located in the photographing optical path at an angle of approximately 45° with respect to the optical axis of a photographing lens, to direct light transmitted through the photographing lens to a finder optical system (viewing position). Upon taking a picture, the quick return mirror is retracted from the photographing optical path to a picture taking position (operative position). After completion of the photographing operation, the quick return mirror is automatically returned to the viewing position.

To reduce the time in which a subject image disappears in the viewfinder, the quick return mirror must be moved as quickly as possible. However, shock generated when the quick return mirror stops increases as the speed of the quick return mirror increases. Consequently, the quick return mirror or the camera body can be damaged from the increased shock. To prevent this, it is known to provide a pneumatic shock absorber or damper in a drive mechanism for the quick return mirror. However, in conventional shock absorbers for single lens reflex cameras, it is impossible to adjust the ability to absorb the shock depending on the usage or purpose of the camera.

SUMMARY OF THE INVENTION

It is an object of the present invention to provide a shock absorber for a single lens reflex camera, in which the ability to absorb shock can be adjusted in accordance with the usage or purpose of the camera.

To achieve the object mentioned above, according to one aspect of the present invention, there is provided a shock absorbing apparatus of a mirror in a single lens reflex camera including of a mirror drive mechanism which moves the mirror from a position normally located within a photographing optical path immediately before the photographing operation. A damper dampens a shock caused when the mirror is moved by the mirror drive mechanism. The damper includes a cylinder, a piston which is moved in the cylinder and is connected to the mirror, a valve mechanism which opens and closes an airflow passage in accordance with the movement of the piston, and an adjusting device which adjusts a surface area of the airflow passage.

The movement of the mirror causes the piston of the damper to move, so that the associated valve is opened in accordance with the movement of the piston. This permits air to flow therethrough from or into the cylinder. Since the surface areas of the airflow passages can be adjusted in the present invention, the shock caused by the movement of the mirror can be absorbed or damped by the adjustment of the airflow rate, depending on the usage or purpose of the camera.

If the adjusting device includes adjusting members provided on opposite ends of the cylinder, the shock caused not only when the piston is moved up but also when it is moved down can be controlled or absorbed.

The adjusting device includes airflow control valves and airflow rate regulators, provided in the cylinder. The airflow control valves and the airflow rate regulators can each be provided with at least one through hole so that the flow of air rate can be controlled in accordance with the degree of overlap between the through holes of the airflow control valves and the airflow rate regulators.

According to another aspect of the present invention, there is provided a shock absorbing apparatus of a mirror in a single lens reflex camera. A mirror drive mechanism moves the mirror from a position normally located within a photographing optical path immediately before the photographing operation. The shock absorbing apparatus includes a reciprocating member connected to the mirror to reciprocate synchronous with the movement of the mirror. A pair of airflow passages are provided on opposite sides of the reciprocating member through which air flows due to the movement of the mirror. A mechanism is also provided for adjusting a surface area of the pair of airflow passages.

It is preferred that the adjusting means are provided in each of the airflow passages to thereby adjust the surface area of the airflow passages independently.

The present disclosure relates to subject matter contained in Japanese Patent Application No. 7-38566 (filed on Feb. 27, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
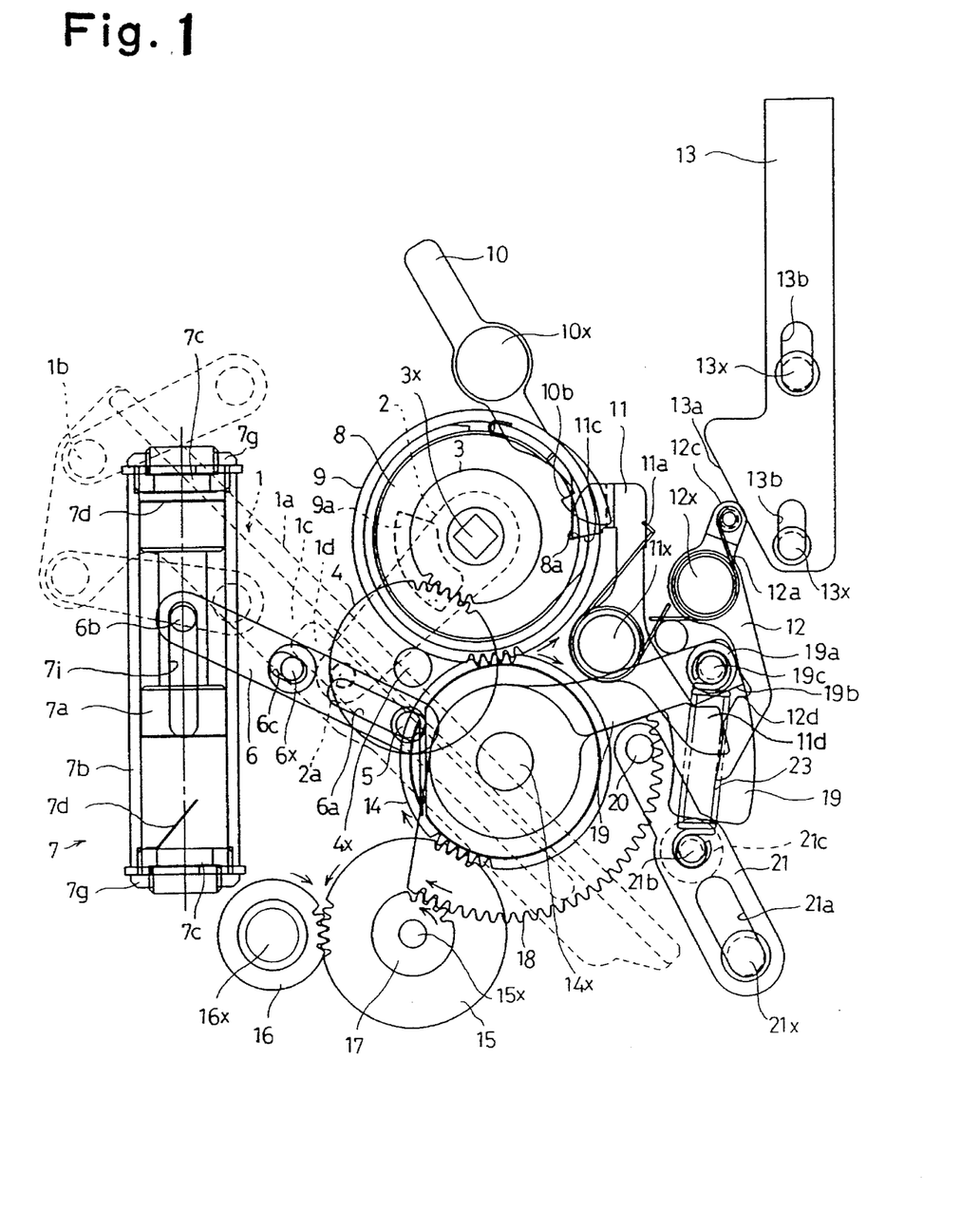
FIG. 1 is a schematic view of a mirror drive mechanism in a shock absorbing apparatus for a mirror in a single lens reflex camera according to an aspect of the present invention.

FIG. 1 shows an embodiment of a mirror drive mechanism having a shock absorber according to an aspect of the present invention. A mirror 1, indicated by a phantom line, is provided in a mirror box (not shown). A photographing lens (not shown) whose optical axis intersects a reflecting surface 1a of the mirror 1 at an angle of approximately 45° is provided on the right side of FIG. 1. A focal plane shutter (not shown) is provided on the left side of the mirror 1. The mirror 1 is secured to a support frame 1c which is rotatable about a support shaft 1b. The support frame 1c is provided on the side surface thereof with an elongated hole 1d extending in a direction parallel with a plane in which the mirror 1 lies.

Shafts 3x, 4x, 14x, 15x, 16x of respective gears 3, 4, 14, 15, 16, shafts 6x, 10x, 11x, 12x, 21x of respective levers 6, 10, 11, 12, 21, and guide pins 13x for a shutter lever 13 are secured to the side surface of the mirror box.

A roller 2a, provided on a free end of a lever 2, is fitted in an elongated hole 1d of the support frame 1c of the mirror 1. The lever 2 is secured at the other end to the shaft 3x of the gear 3. The gear 3 is in mesh with the gear 4, which has a pin 5 slidably fitted in an elongated hole 6a formed at one end of a connecting lever 6. The connecting lever 6 is rotatably connected at the other end to a piston 7a of a damper 7 through a shaft 6b. The damper 7 includes a cylinder 7b with the sliding piston 7a. The cylinder 7b is provided on the intermediate portion thereof with an elongated hole 7i which extends in the longitudinal direction of the cylinder 7b. The shaft 6b is fitted in the elongated hole 7i. The connecting lever 6 is connected to the shaft 6x through an elongated hole 6c formed on the connecting lever 6 to permit the lever 6 to move in a lengthwise direction, The damper 7 includes airflow rate regulators 7c screw-engaged at opposite ends of the cylinder 7b, and airflow control valve sheets 7d provided on the inner side of the respective airflow rate regulators 7c within the cylinder. The airflow control valve sheets 7d are partially secured at the peripheral edges thereof to the cylinder 7b so as not to rotate relative to the cylinder 7b and to move away from and close to the airflow rate regulators 7c due to the flow of air caused in the cylinder 7b.

Figure 7:
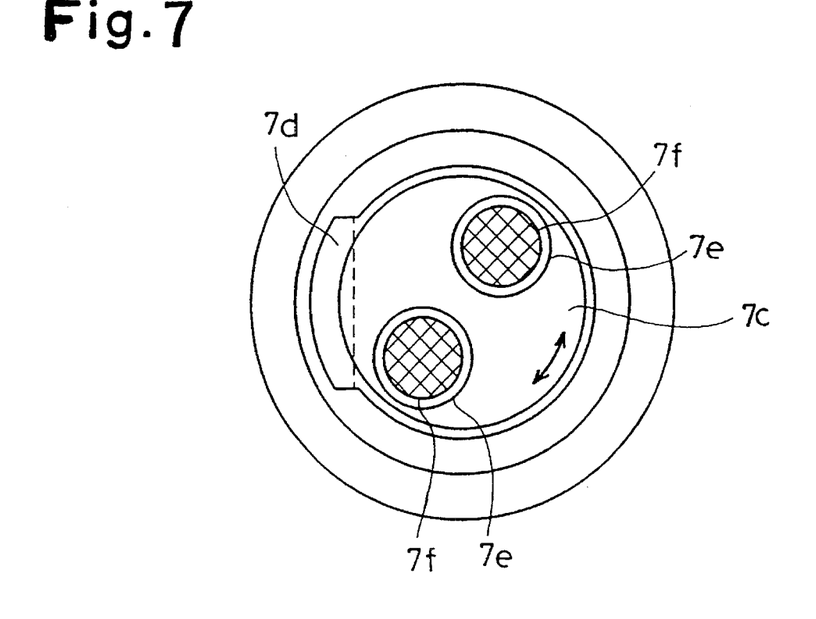
FIG. 7 is an explanatory view of an adjusting apparatus for a shock absorber in a fully open position in which through holes of airflow control valves are aligned with corresponding through holes of airflow rate regulators according to an embodiment of the present invention.

FIG. 7 shows an arrangement of one of the airflow rate regulators 7c screwed in the upper and lower ends of the cylinder 7b and the corresponding airflow control valve sheet 7d. As can be seen in FIG. 7, the airflow rate regulator 7c and the airflow control valve sheet 7d are respectively provided with a pair of through holes 7f and 7e, that are deviated from the center axis of the cylinder 7b. The through holes 7e of the airflow control valve sheet 7d and the through holes 7f of the airflow rate regulator 7c are located on an imaginary circle. The diameter of the through holes 7e is slightly larger than the diameter of the through holes 7f. When the airflow rate regulators 7c are rotated with respect to the cylinder 7b to vary the angular position (circumferential phase) of the through holes 7f, the circumferential position of the through holes 7f relative to the through holes 7e can be adjusted to vary the surface areas of the air passages defined by the overlap of the corresponding through holes 7e and 7f.

The gear 3 is formed integrally with an upper engaging plate 8, and is engaged by a mirror elevating gear 9 through a spring (not shown) so as to relatively rotate. The upper engaging plate 8 and the mirror elevating gear 9 are coaxial to the shaft 3x. The mirror elevating gear 9 is provided on an outer surface of a cylindrical housing in which the spring (not shown) is housed. The spring is secured at one end thereof to the upper engaging plate 8 and at the other end to the mirror elevating gear 9, so that when the mirror elevating gear 9 rotates in the counterclockwise direction in FIG. 1, the spring energy is charged. The mirror elevating gear 9 is provided on the rear surface thereof (as viewed in FIG. 1) with a stop 9a, formed as a protrusion.

An engaging lever 10 is provided on the front end thereof with an engaging portion 10b biased in a direction, about the shaft 10x, to engage with the stop 9a by means of a spring (not shown), i.e., in the clockwise direction as viewed in FIG. 1.

A releasing lever 11 is biased in the counterclockwise direction about the shaft 11x by a spring 11a, so that an engaging portion 11c, provided on the upper end of the releasing lever 11, engages with an engaging portion 8a of the upper engaging plate 8.

A trigger lever 12 is biased in the clockwise direction about the shaft 12x by a spring 12a. The trigger lever 12 is provided on the upper end thereof with a head portion 12c which abuts against a front oblique surface 13a of the shutter lever 13. The trigger lever 12 is also provided on the lower end thereof with an engaging surface 12d.

The shutter lever 13 has a pair of elongated holes 13b which extend in the vertical direction in FIG. 1, and in which a pair of guide pins 13x are fitted to permit the shutter lever 13 to move in the lengthwise direction of the elongated holes 13b within a limit defined by the length of the elongated holes.

A control lever 19 is coaxially pivoted to the shaft 14x of the mirror lowering gear 14. The mirror lowering gear 14 is provided on an outer peripheral surface of a cylindrical housing (not shown) in which a spring (not shown) is housed, similar to the cylindrical housing for the mirror elevating gear 9.

A sector gear 18 is coaxially and rotatably supported by the shaft 14x to rotate relative to the mirror lowering gear 14. The spring in the housing of the mirror lowering gear 14 is connected at one end to the gear 14 and at the other end to the sector gear 18, so that the spring force of the spring is charged when the mirror lowering gear 14 is rotated in the clockwise direction. The mirror lowering gear 14 meshes with the mirror elevating gear 9 and a charge gear 15, which is in turn meshes with the charge gear 16.

The control lever 19 is provided with a roller 19a which is selectively engaged with the engaging portion 11d of the releasing lever 11, and an engaging surface 19b which is selectively engaged with the engaging surface 12d of the trigger lever 12. A tensile spring 23 is provided on a lever 21 between the shaft 19c of the roller 19a and the shaft 21b, so that the control lever 19 is biased in the clockwise direction about the shaft 14x and the lever 21 is biased in the clockwise direction about the shaft 21x. A roller 21c is provided about the shaft 21b.

The sector gear 18 meshes with a small diameter charge gear 17 secured to the shaft 15x of the charge gear 15. The sector gear 18 is provided with a pin 20 to which the lever 21 is pivoted at one of its ends. The lever 21 is provided with an elongated hole 21a in which the shaft 21x is slidably fitted.

The operation of the mirror drive mechanism as constructed above will now be explained.

(Charging of Energy)

When a film is wound or rewound manually or by a motor driven mechanism, the charge gear 16 is rotated in the clockwise direction in FIG. 1. Consequently, the charge gears 15 and 17 are rotated in the counterclockwise direction.

The rotation of the charge gear 17 in the counterclockwise direction rotates the sector gear 18 in the clockwise direction, moving pin 20, which is integral with the sector gear 18. Movement of the pin 20 rotates the lever 21 about the shaft 21x in the counterclockwise direction while moving relative to the shaft 21x through the engagement of the shaft 21x and the elongated hole 21a. As a result, the control lever 19 is moved down (rotated in the clockwise direction) by the tensile spring 23, and the engaging surface 19b comes into contact with the engaging surface 12d of the trigger lever 12 (FIG. 1). Consequently, no further rotation of the control lever 19 occurs. Thus, the tensile spring 23 is tensed due to a further rotation of the lever 21 in the counterclockwise direction to charge the energy in the spring (spring force).

The rotation of the charge gear 15 in the counterclockwise direction rotates the mirror lowering gear 14 in the clockwise direction to charge the energy in the spring provided within the housing of the gear 14. At the same time, the mirror elevating gear 9 is rotated in the counterclockwise direction to charge the energy in the spring provided within the housing of the gear 9.

Figure 2:
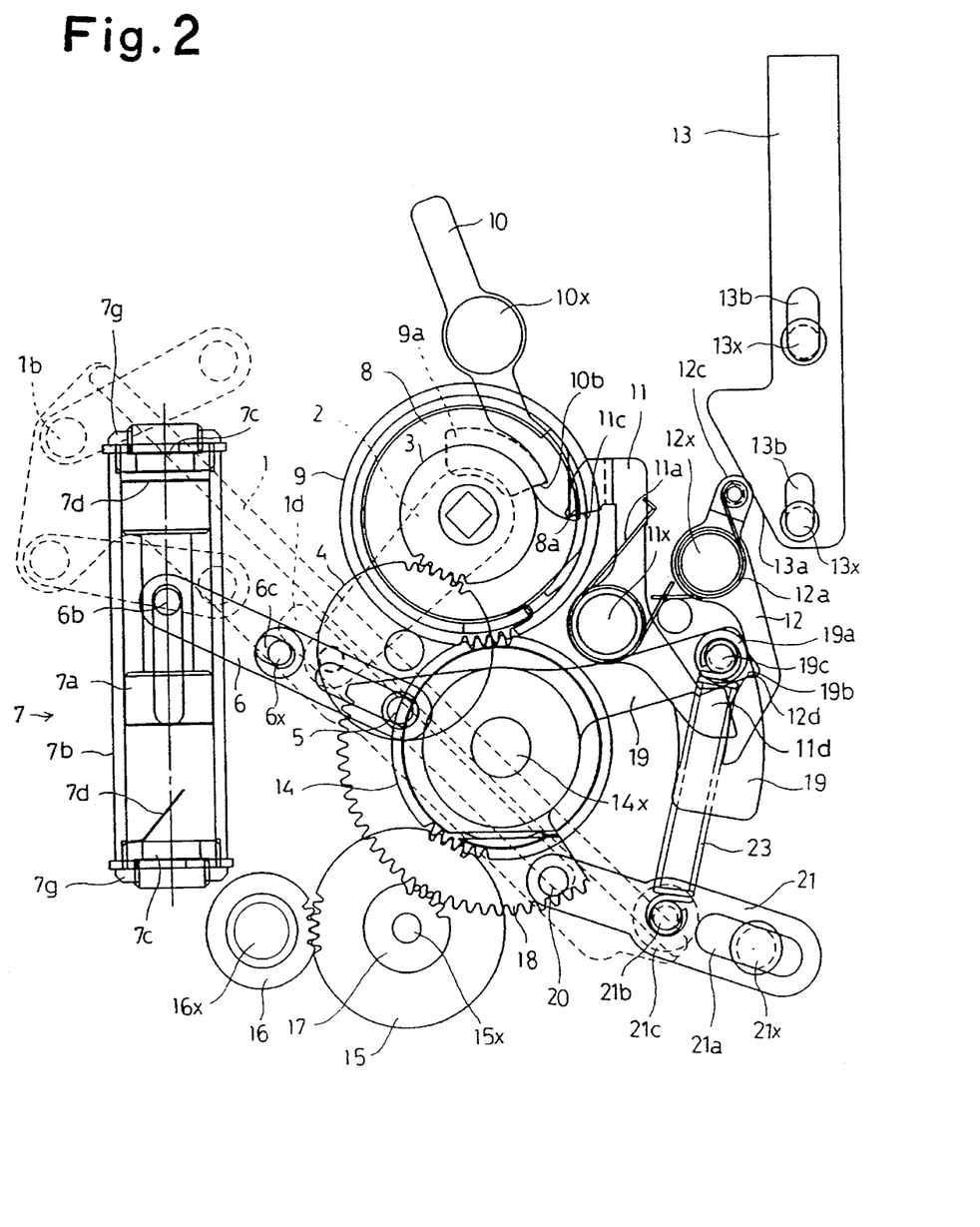
FIG. 2 is a schematic view similar to FIG. 1, in a position in which a spring charging operation is complete.

FIG. 2 shows a state when the charging has completed. As can be seen in FIG. 2, when approximately a ⅔ (two-third) rotation of the mirror elevating gear 9 takes place, energy charging is complete. In this position, the stop 9a engages with the engaging portion 10b of the engaging lever 10 to hold the charged energy.

(Upward Movement of the Mirror)

Figure 3:
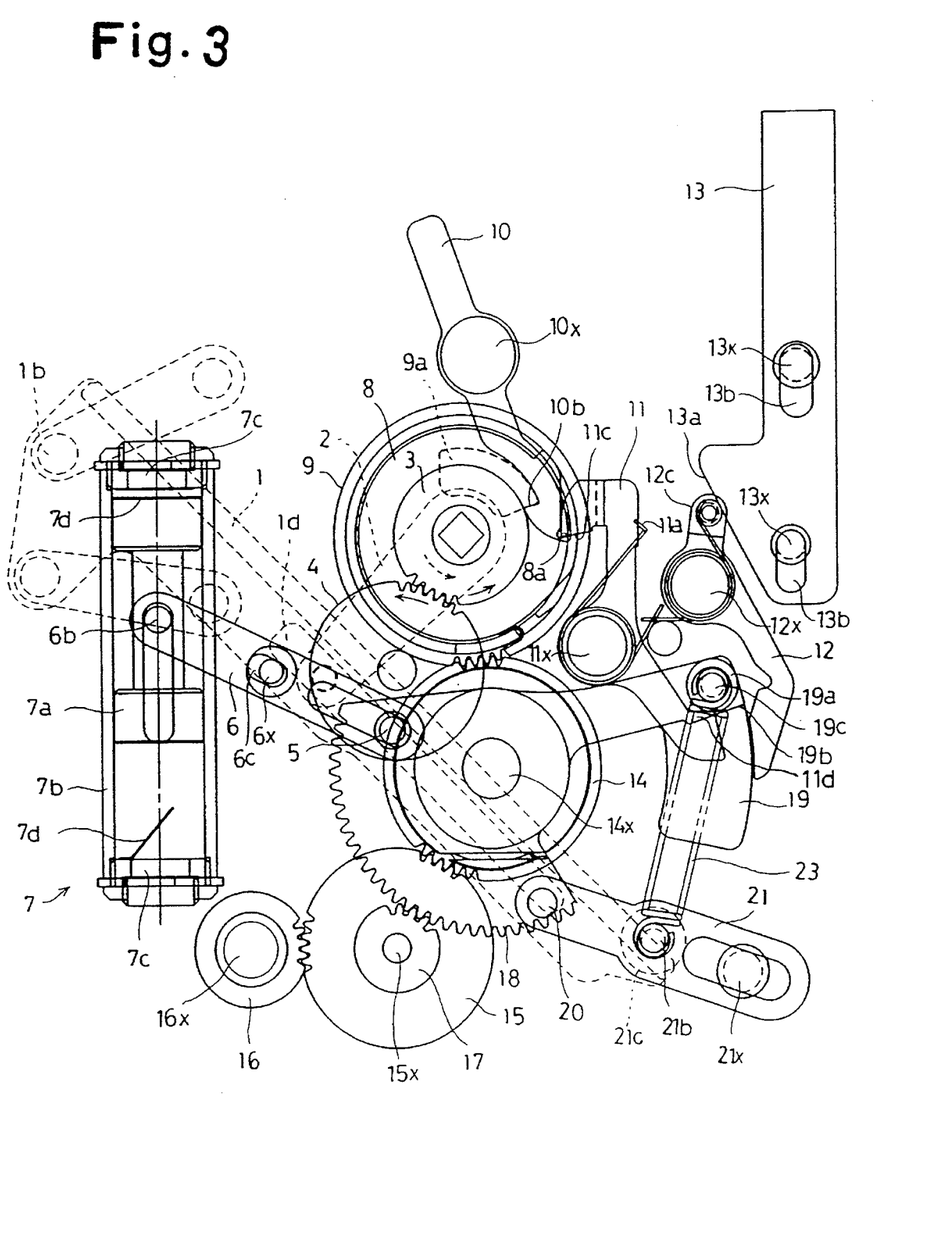
FIG. 3 is a schematic view similar to FIG. 1, in a position in which a trigger lever is disengaged.

When a shutter button (not shown) is depressed when the camera is in the position shown in FIG. 2, the shutter lever 13 is moved downwardly, as shown in FIG. 3. As a result, the front oblique surface 13a of the shutter lever 13 pushes the head portion 12c of the trigger lever 12 in a leftwards direction, rotating the trigger lever 12 in the counterclockwise direction. Consequently, the trigger lever 12 is disengaged from the engaging surface 19b of the control lever 19. As a result, the control lever 19 is rotated in the clockwise direction by the tensile spring 23. Thus, the roller 19a pushes the engaging portion 11d downwardly to rotate the release lever 11 in the clockwise direction against the spring 11a. The extremity of the rotational movement of the control lever 19 in the clockwise direction is defined by the roller 21c of the lever 21.

Figure 4:
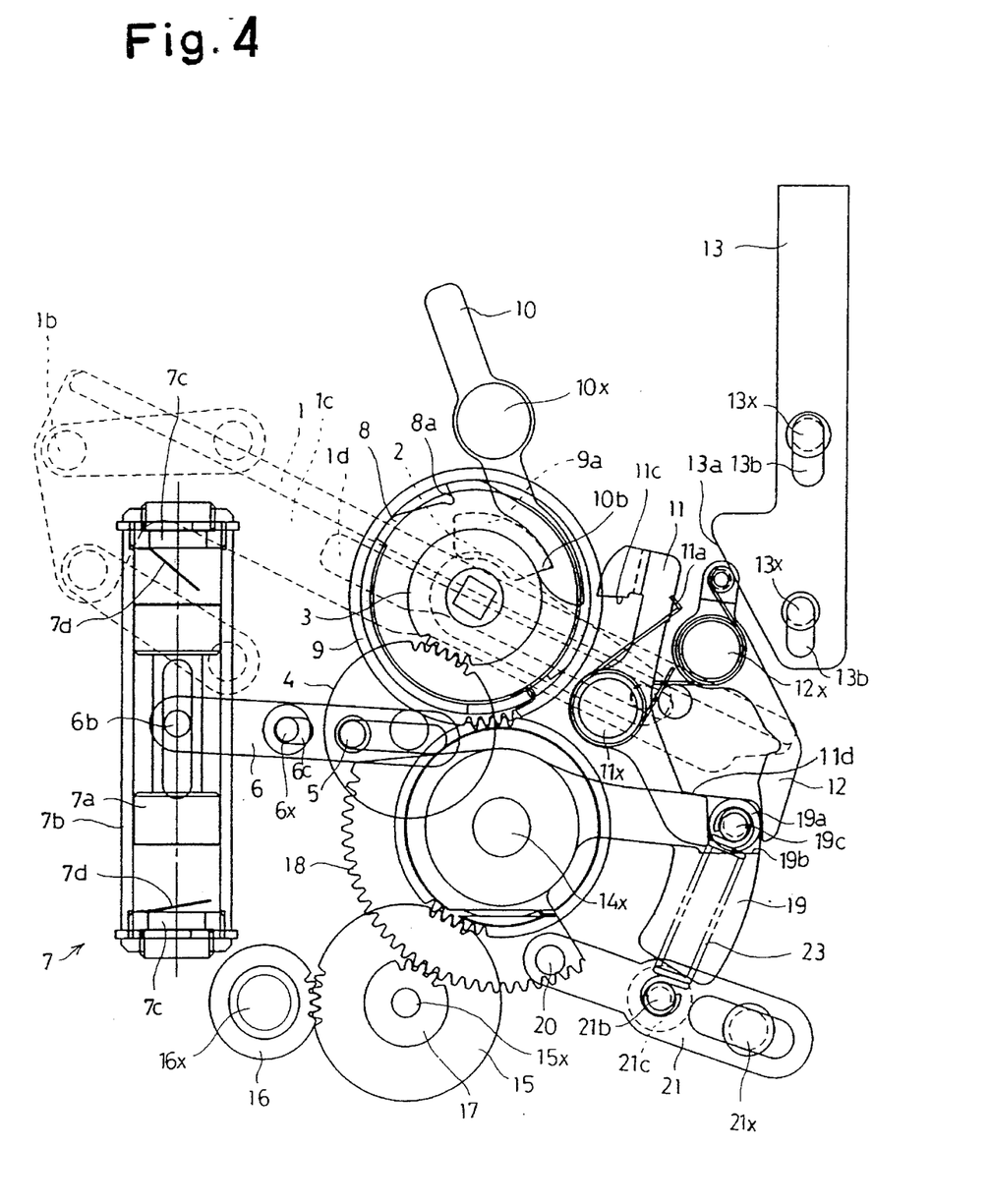
FIG. 4 is a schematic view similar to FIG. 1, in a position in which a mirror elevating gear is disengaged to elevate a mirror.

When release lever 11 rotates in the clockwise direction, the engaging portion 8a of the upper engaging plate 8 disengages from the engaging portion 11c of the release lever 11. Consequently, the upper engaging plate 8 is rotated in the counterclockwise direction due to the energy charged in the spring (provided in the housing for the mirror elevating gear 9 to rotate the lever 2, which is integral with the upper engaging plate 8 and the gear 3), in the counterclockwise direction. Thus, the mirror 1 is rotated about the axis of the shaft 1b to elevate the same toward the upper position, i.e., the picture taking position shown in FIG. 4. Through the rotation of the gear 3, the gear 4 rotates in the clockwise direction, so that the connecting lever 6 engaged by the gear 4 is rotated in the counterclockwise direction about the axis of the shaft 6x to move the piston 7a in the downward direction in FIG. 4.

Figure 5:
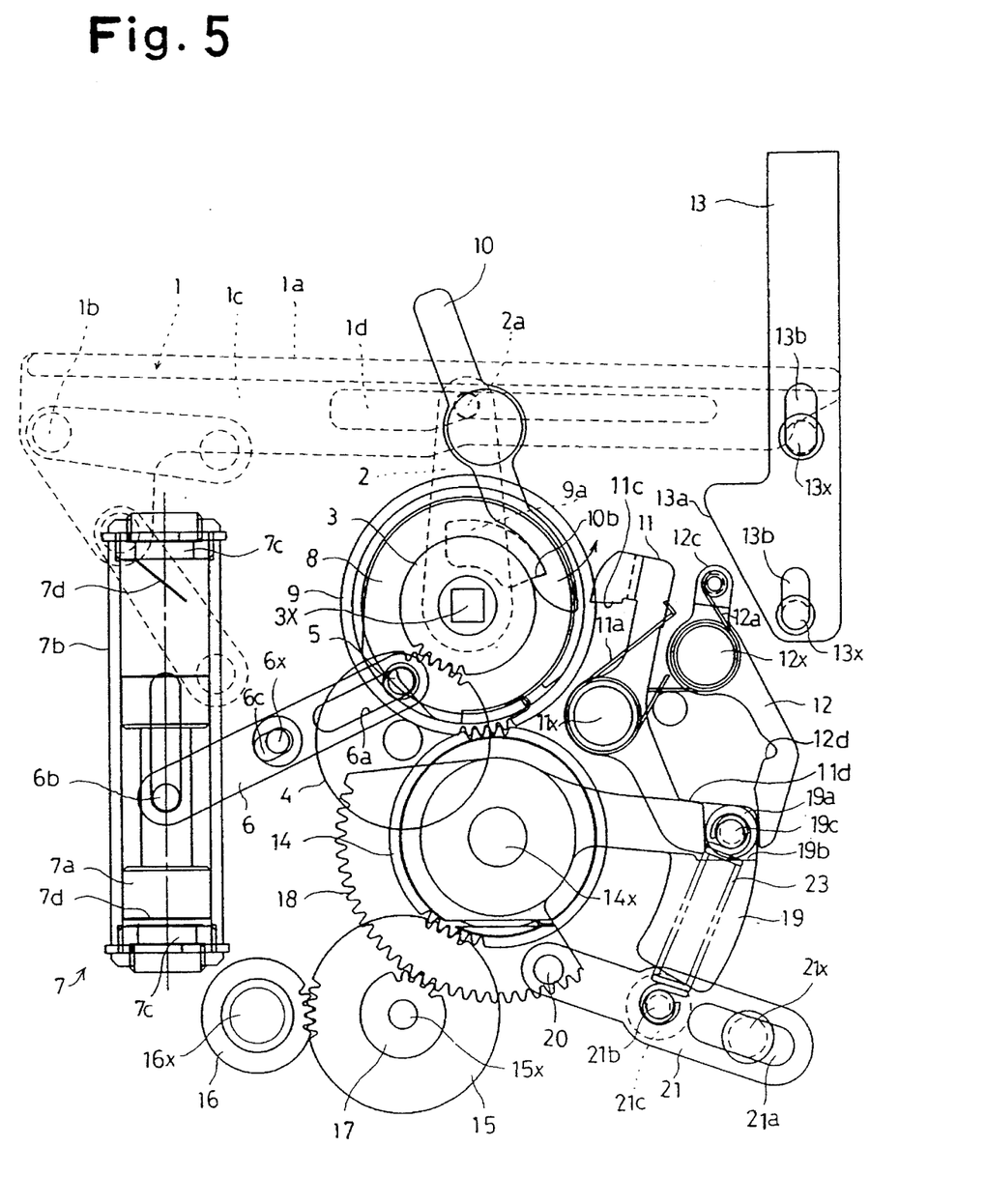
FIG. 5 is a schematic view similar to FIG. 1, in a position in which a mirror is moved to an upper position.
Figure 6:
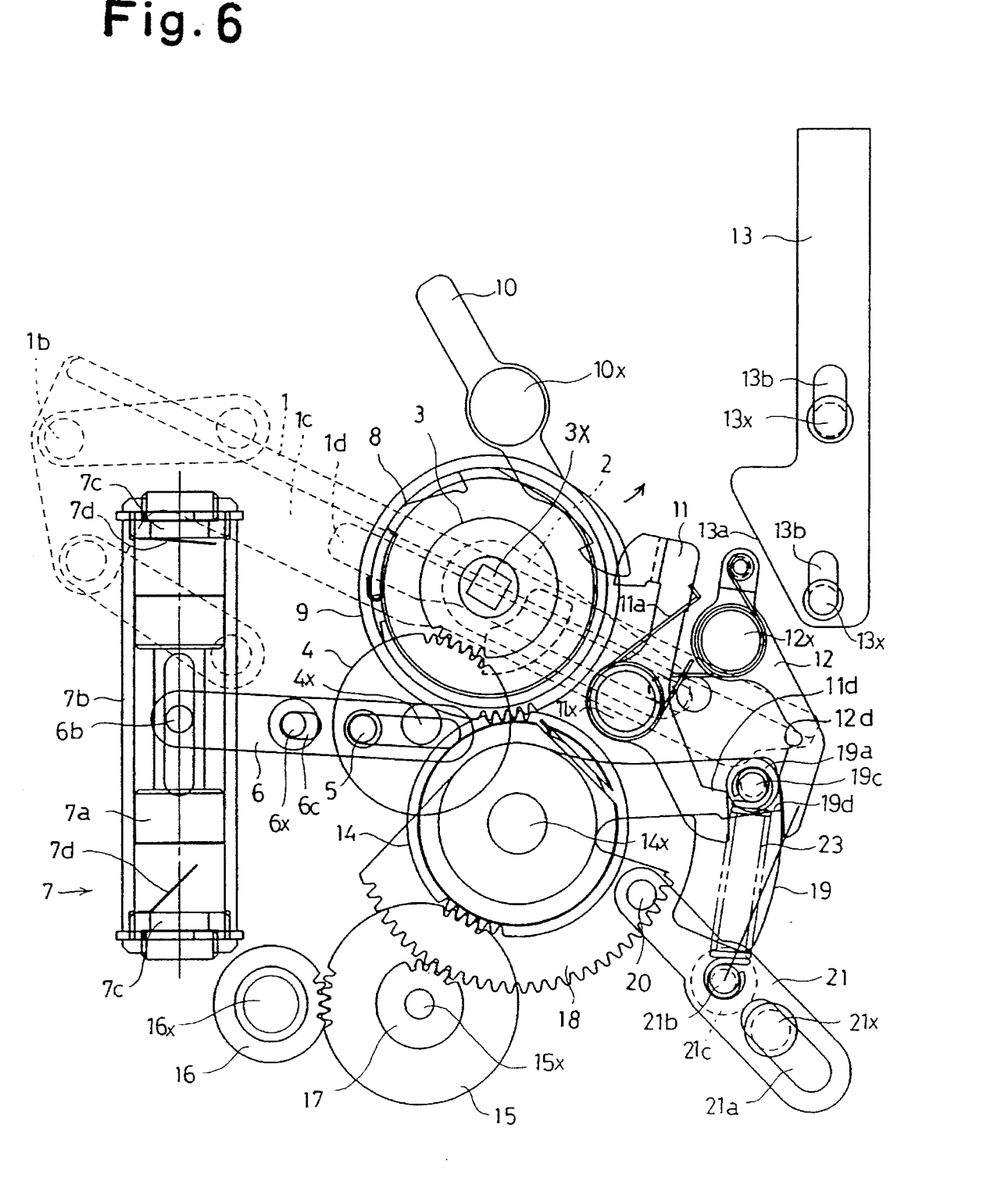
FIG. 6 is a schematic view similar to FIG. 1, in a position in which a mirror is moved to a lower position.

When the mirror 1 is elevated to the upper position (substantially horizontal position) in which the mirror 1 is retracted from the photographing optical path, as shown in FIG. 5, further upward movement of the mirror 1 is prevented by a stopper (not shown). In this state, part of the upper engaging plate 8 abuts against the stop 9a of the mirror elevating gear 9 to stop the rotation in the counterclockwise direction. At this moment, a shock occurs between the mirror 1 and the camera body.

(Downward Movement of Mirror)

When the mirror is retracted from the photographing optical path, the shutter is opened to carry out the photographing operation. Thereafter, the engaging lever 10 is rotated by a kick mechanism (not shown) in the counterclockwise direction in FIG. 5. Consequently, the engaging portion 10b, at the front end of the engaging lever 10, is disengaged from the stop 9a. Hence, all the gears of the mirror elevating mechanism are freed (disengaged). Consequently, the mirror elevating gear 9 and the upper engaging plate 8 are rotated in the clockwise direction due to the energy charged in the spring provided in the housing for the mirror lowering gear 14. Also, the lever 2 and the gear 3 are rotated in the clockwise direction to lower the mirror 1 to a lower position and raise the piston 7a. Since the mirror lowering gear 14 is rotated in the counterclockwise direction, the charge gears 15 and 17 are both rotated in the clockwise direction to rotate the sector gear 18 in the counterclockwise direction. Consequently, the lever 21 is rotated in the clockwise direction to raise the control lever 19. When the control lever 19 is elevated, the engaging surface 19b engages with the engaging surface 12d of the trigger lever 12.

When the mirror 1 moves downwardly, it abuts against a stopper (not shown), so that the downward movement of the mirror is stopped at the initial position shown in FIG. 1. At this moment, a shock occurs. As can be seen from the above discussion, the piston 7a moves downwardly and upwardly when the mirror 1 is moved upwardly and downwardly, respectively.

(Pneumatic Damper)

When the piston 7a moves downwardly, the lower valve sheet 7d located below the piston 7a is moved toward the lower airflow rate regulator 7c by the flow of air from the movement of the piston 7a. This restricts the through hole 7f of the airflow rate regulator 7c and compresses the air in the lower pressure chamber of the cylinder 7b. At the same time, the upper pressure chamber of the cylinder 7b has a negative pressure. Consequently, the upper valve sheet 7d located above the piston 7a is moved toward the piston 7a by the flow of air through the through hole 7f from the movement of the piston 7a, so that external air flows into the upper pressure chamber of the cylinder through the upper valve sheet 7d. When the piston 7a moves upwardly, a phenomenon opposite to the foregoing occurs (vice versa). In view of the operations mentioned above, it will be understood that the shock which occurs upon upward or downward movement of the mirror is damped by appropriately controlling the rate of change in the internal pressure of the cylinder.

Figure 8:
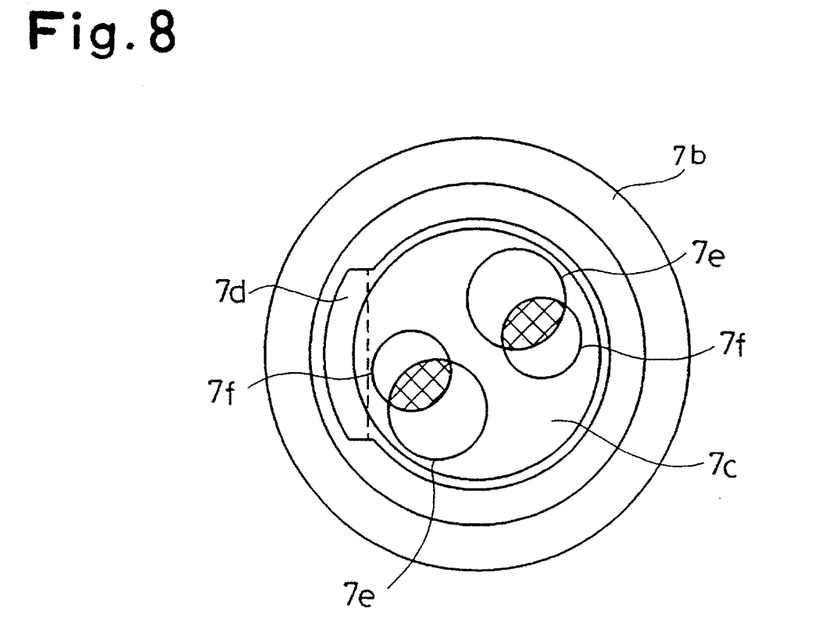
FIG. 8 is an explanatory view of the adjusting apparatus shown in FIG. 7, in a partially open position.
Figure 9:
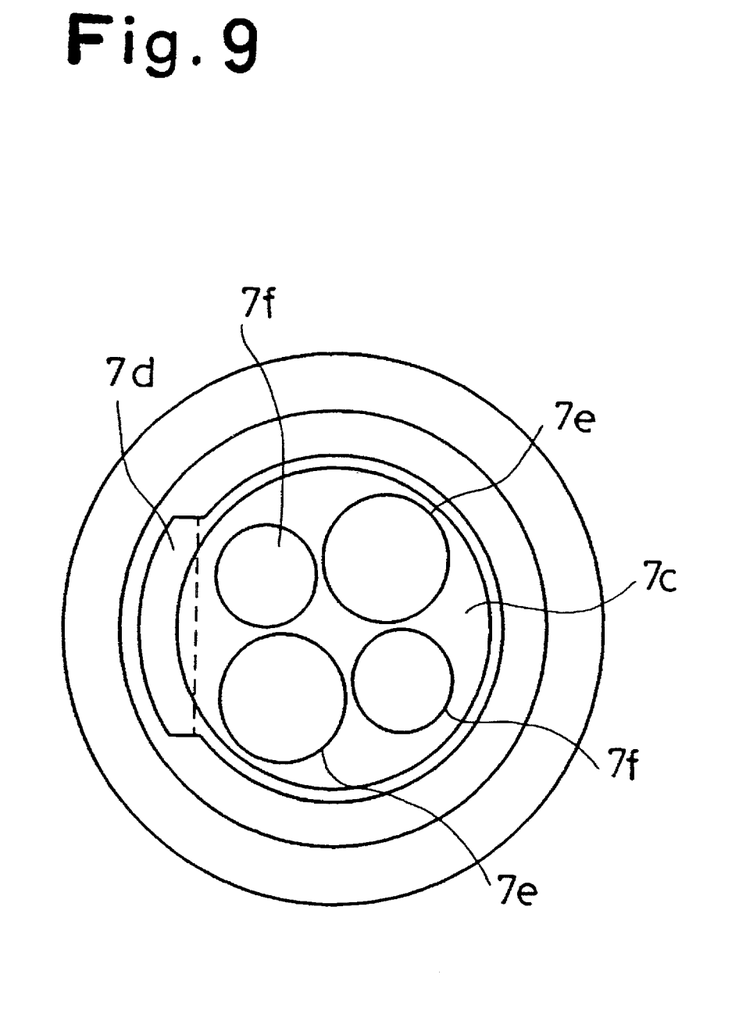
FIG. 9 is an explanatory view of the adjusting apparatus shown in FIG. 7, in a fully closed position; and, FIG. 10 is an enlarged sectional view of a damper of the adjusting apparatus shown in FIG. 7.

In FIG. 7, the through holes 7e are completely aligned with the corresponding through holes 7f to establish fully open air passages. In FIG. 8, the through holes 7e are partially aligned with the corresponding through holes 7f to establish partially open air passages. In FIG. 9, the through holes 7e are not aligned with the corresponding through holes 7f. The airflow rate regulators 7c can be locked at the respective adjusted positions by lock members as discussed below.

The airflow control mechanism mentioned above will be described below in more detail with reference to FIG. 10.

Figure 10:
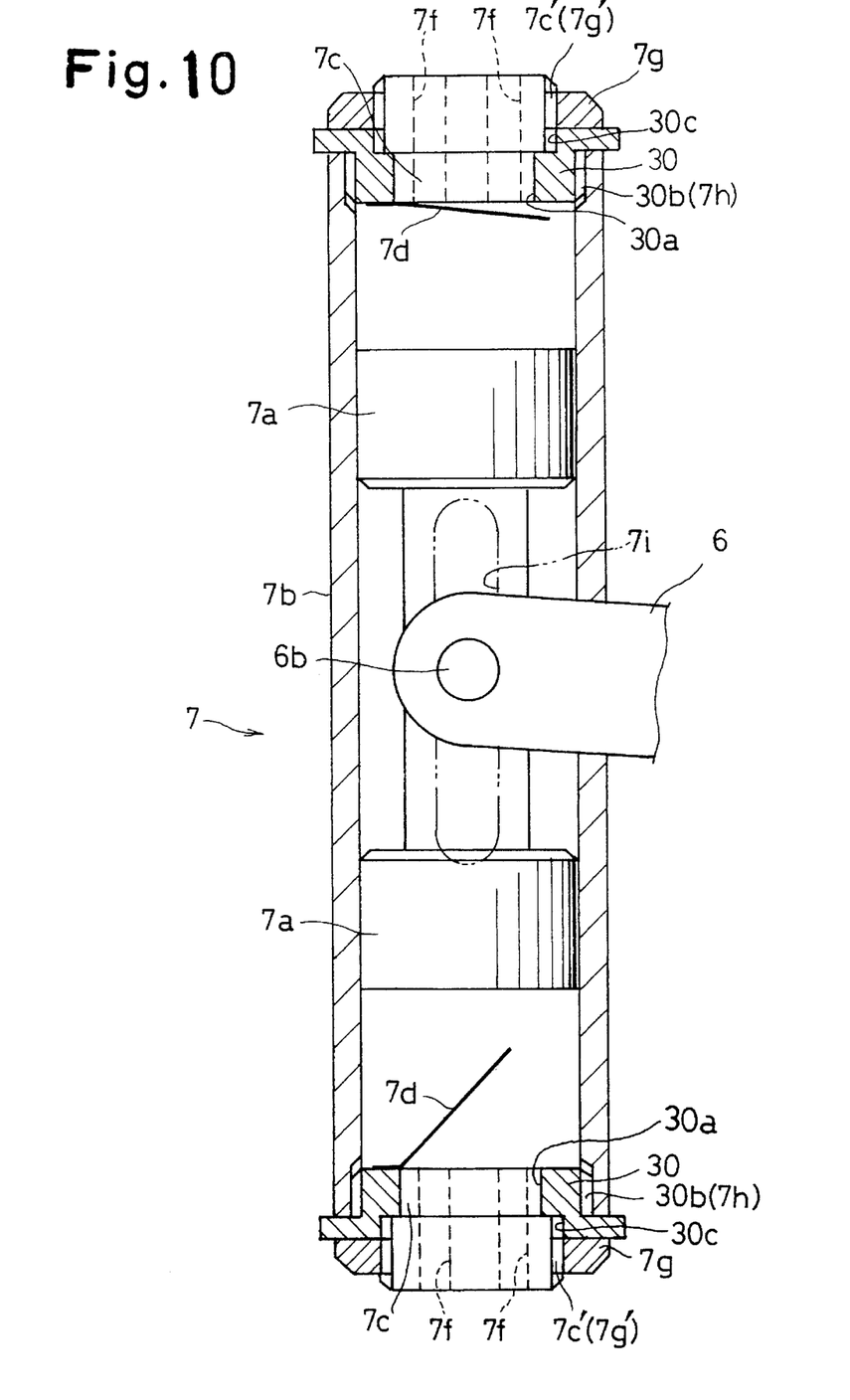

As may be seen in FIG. 10, the cylinder 7b is provided on the upper and lower ends thereof with threaded holes (female portions) 7h in which annular members 30 having threaded portions (male screw portions) formed on the outer peripheral surface thereof are screw-engaged. The annular members 30 are provided with circular central holes 30a in which the airflow rate regulators 7c are rotatably fitted. The circular holes 30a are provided on the outer ends thereof with threaded large diameter portions 30c (female screw portions) whose diameter is slightly larger than the diameter of the remaining portions of the circular holes 30a. The airflow rate regulators 7c are provided on the outer ends thereof with threaded large diameter portions (male screw portions) 7c' which are screw-engaged in the threaded large diameter portions 30c of the annular members 30.

The airflow control valve sheets 7d are partially secured to the associated annular members 30. The two through holes 7f of each airflow rate regulator 7c are opened to the corresponding airflow control valve sheets 7d. The male screw portions 7c' of the airflow rate regulators 7c are engaged in threaded holes 7g' of locking nuts 7g.

Consequently, when the locking nuts 7g are rotated and fastened with respect to the cylinder 7b after the airflow rate regulators 7c are rotated relative to the corresponding airflow control valve sheets 7d, the airflow rate regulators 7c can be locked to the cylinder 7b to fix the adjusted position of the airflow rate regulators 7c with respect to the airflow control valve sheets 7d.

Upon movement of the piston, the internal air in the cylinder is compressed. The compression ratio of the air, i.e., the flow resistance, varies depending on the surface area of the air passages. Namely, the compression ratio (and the flow resistance) is highest in FIG. 9 and lowest in FIG. 7. The values of the compression ratio and the flow resistance in FIG. 8 are between those in FIGS. 7 and 9. The speed of the movement of the mirror decreases as the compression ratio increases. Namely, the shock absorbability can be enhanced as the compression ratio increases.

If the compression ratio is increased to enhance the shock absorbability, the speed of the movement of the mirror 1 is remarkably reduced, and hence, is not suitable for continuous shooting. Moreover, the shock caused upon the upward movement of the mirror 1 has an influence on the exposure of the film, but the shock caused upon the downward movement of the mirror 1 has little influence on the exposure of the film.

As can be understood from the above discussion, if the camera is being used for normal photography, the lower airflow control valve, below the piston in the cylinder 7b, is fully closed as shown in FIG. 9, and the upper airflow control valve is set in a position shown in FIG. 7 or 8. For continuous shots, the lower airflow control valve is set in a position shown in FIG. 7 or 8.

The adjustment of the surface area of the air passages of a damper is usually carried out when an associated camera is assembled. If the usage or purpose of the camera is modified after being sold, the adjustment can be effected, for example, in camera service centers etc.

As can be understood from the foregoing, according to the present invention, in a shock absorbing apparatus of a mirror in a single lens reflex camera, since a damper is provided including a cylinder, a piston which is moved in the cylinder in association with the mirror, a valve mechanism which opens and closes in accordance with the movement of the piston, and an adjuster which adjusts the surface area of a flow passage of the valve mechanism to control the flow rate passing through the flow passage in accordance with the movement of the piston, a shock which is produced when the mirror is moved up or down can be controlled depending on the usage of the camera.

Although the invention has been described with reference to particular means, materials and embodiments, it is to be understood that the invention is not limited to the particulars disclosed and extends to all equivalents within the scope of the claims.

What is claimed is:

1. A shock absorbing apparatus of a mirror in a single lens reflex camera, comprising:

a mirror drive mechanism which moves said mirror, which is normally located within a photographing optical path, out of the photographing optical path immediately before a photographing operation; and a damper which damps a shock caused when said mirror is moved by said mirror drive mechanism;

said damper comprising:

a cylinder;

a piston which is moved in said cylinder and which is connected to said mirror;

a valve mechanism which opens and closes a flow passage in accordance with the movement of said piston; and an adjusting device which adjusts a surface area of said flow passage of said valve mechanism.

2. The shock absorbing apparatus of a mirror in a single lens reflex camera according to claim 1, wherein said adjusting device comprises adjusting members provided on opposite ends of the cylinder.

3. The shock absorbing apparatus of a mirror in a single lens reflex camera according to claim 1, wherein said adjusting device comprises a plurality of airflow control valves and a plurality of airflow rate regulators, provided in said cylinder, said plurality of airflow control valves and said plurality of airflow rate regulators each being provided with at least one through hole so that the airflow rate can be controlled in accordance with a degree of overlap between the at least one through hole of the plurality of airflow control valves and the plurality of airflow rate regulators.

4. The shock absorbing apparatus of a mirror in a single lens reflex camera according to claim 3, wherein said plurality of airflow rate regulators are rotatable with respect to said cylinder, and wherein said plurality of airflow control valves are movable away from and towards the respective ones of said plurality of airflow rate regulators without rotating relative to said cylinder, so that an overlap of said at least one through hole of said plurality of air flow rate control valves and said plurality of airflow rate regulators can be modified in accordance with rotation of said plurality of airflow rate regulators relative to associated ones of said plurality of airflow control valves.

5. The shock absorbing apparatus of a mirror in a single lens reflex camera according to claim 4, wherein said at least one through hole of said plurality of airflow control valves are deviated from the center axis of said cylinder, and wherein at least one through hole of said plurality of airflow rate regulators can be aligned with the corresponding at least one through hole of said plurality of airflow control valves in accordance with relative rotation of said plurality of airflow rate regulators with respect to corresponding ones of said plurality of airflow control valves.

6. The shock absorbing apparatus of a mirror in a single lens reflex camera according to claim 4, further comprising a locking device which locks said plurality of airflow rate regulators to said cylinder after positions of said plurality of airflow rate regulators with respect to the corresponding airflow control valves have been adjusted.

7. The shock absorbing apparatus of a mirror in a single lens reflex camera according to claim 6, wherein said plurality of airflow rate regulators are provided with threaded portions screw-engaged in the ends of said cylinder, and wherein said locking device is provided with locking nuts screw-engaged by said threaded portions of said plurality of airflow rate regulators projecting outwardly from ends of said cylinder, and which can be fastened to press against said ends of said cylinder.

8. A shock absorbing apparatus of a mirror in a single lens reflex camera, said single lens reflex camera having a mirror drive mechanism which moves said mirror, which is normally located within a photographing optical path, out of the photographing optical path immediately before a photographing operation, said shock absorbing apparatus comprising:

a reciprocating member connected to said mirror to reciprocate synchronously with movement of said mirror;

a pair of airflow passages provided on both sides of said reciprocating member through which air flows due to movement of said mirror, a direction of air flow in each of said pair of airflow passages being opposite one another; and means for adjusting a surface area of said pair of said airflow passages.

9. The shock absorbing apparatus according to claim, 8, wherein said adjusting means is provided for each of said airflow passages to adjust said surface area of each of said airflow passages independently.

* * * * *